US005433903A

United States Patent [19]

Hauser et al.

[11] Patent Number: 5,433,903

[45] Date of Patent: Jul. 18, 1995

[54] PROCESS FOR THE CONTROL AND REGULATION OF THE PRESSING PROCESS OF A BRICK PRESS

[75] Inventors: Hans U. Hauser, Niederweningen, Switzerland; Hans J. Zenner, Trier; Martin Mick, Föhren, both of Germany

[73] Assignee: Laeis-Bucher GmbH, Trier, Germany

[21] Appl. No.: 87,808

[22] PCT Filed: Oct. 2, 1992

[86] PCT No.: PCT/CH92/00200

§ 371 Date: Jul. 15, 1993

§ 102(e) Date: Jul. 15, 1993

[87] PCT Pub. No.: WO93/09939

PCT Pub. Date: May 27, 1993

[30] Foreign Application Priority Data

Nov. 15, 1991 [CH] Switzerland ........................ 3336/91

[51] Int. Cl.$^6$ ........................ B29C 43/02

[52] U.S. Cl. ........................ 264/37; 264/40.5; 425/149; 425/150

[58] Field of Search ................. 264/37, 40.5; 425/149, 425/150

[56] References Cited

U.S. PATENT DOCUMENTS

| | | | |
|---|---|---|---|
| 4,373,889 | 2/1983 | Brown | 425/150 |
| 4,946,634 | 8/1990 | Shaner | 264/40.5 |
| 5,043,111 | 8/1991 | Hinzmann et al. | 264/40.5 |
| 5,211,964 | 5/1993 | Prytherch et al. | 425/140 |

*Primary Examiner*—Mary Lynn Theisen
*Attorney, Agent, or Firm*—Edmund M. Jaskiewicz

[57] ABSTRACT

A brick press for the production of formed bodies from free-flowing materials has a measuring and comparison device, in which pressing force and press path are detected from the beginning of the pressing process and are compared with a preset pressure curve, which represents the pressure/path setpoint value of the pressing process. Any deviations from the force/path setpoint value determined outside a range of tolerance of pressure curve are used as a signal for early ending of the pressing process. Reject formed bodies resulting in this case can be crushed effortlessly and again recycled in the initial material to be pressed without subsequent treatment. A process is also disclosed for the control and regulation of the pressing process.

6 Claims, 2 Drawing Sheets

PROCESS FOR THE CONTROL AND REGULATION OF THE PRESSING PROCESS OF A BRICK PRESS

Figure 1:
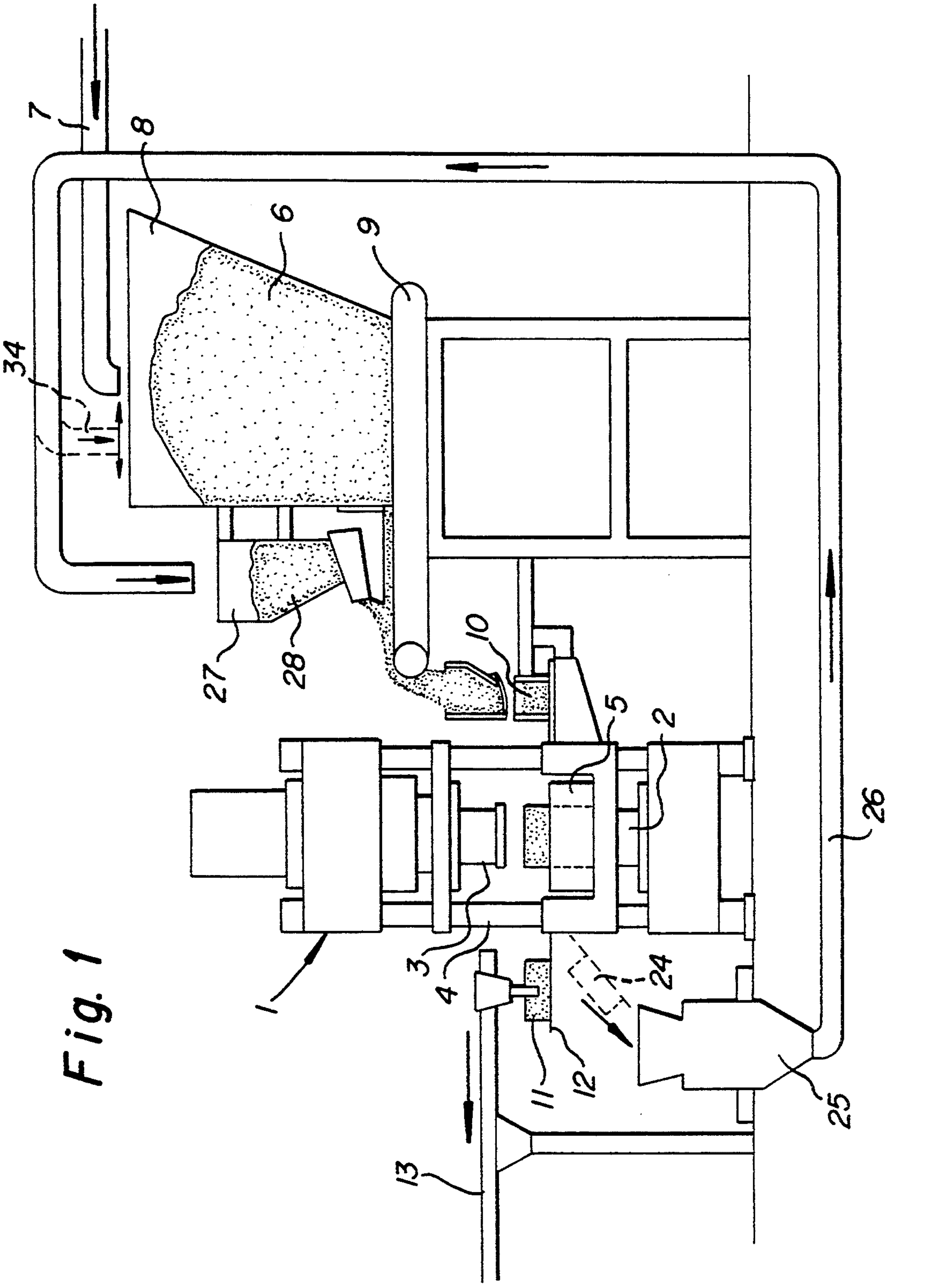

The invention relates to a process and apparatus for control and/or adjustment of the pressing process of a brick press for the production of formed bodies from free-flowing materials, especially refractory, ceramic materials, with a measuring and comparison device for determining setpoint value deviations of the pressing parameters, which are used to control the pressing process.

An impact press is known from DE-OS 40 09 608, in which the path of the die is measured at the end of the press path with the help of the sensor. The sensor is connected with a measuring and comparison device, in which the determined actual measurement of the thickness of the brick is compared with the desired measurement of the formed body to be pressed and is used as a signal to turn off the press. By a subsequent measuring stroke of the die, after expansion of the formed body has been completed, a second actual measurement is determined that is compared in the measuring and comparison device also with the desired measurement of the formed body. As a result, values are obtained that deviate from the desired measurement. The measurement of this deviation is used to correct the mold-filling capacity of the subsequent pressing process. In this way, the production process can be controlled with relatively low reject rates.

If the deviation from the desired measurement determined at the end of the pressing process lies outside the range of tolerance, the already completed formed body is a reject and is no longer to be used. In the course of recycling measures, it would be desirable to again feed reject formed bodies to the production process by reprocessing and to fill the crushed material in the mold. But this presents various problems. The final-pressed reject formed body is very hard and can be crushed only at a relatively high cost and expenditure of time. Another serious drawback is that additives, which are added to the mold-filling material before the pressing, become unusable or are irreversibly set by the pressing process. After working up the reject formed bodies in the case of reuse of the crushed material, these additives again have to be mixed with the mold-filling material. In addition, the additives that have become unusable are contained in the mold-filling material as impurities and contaminate the latter. The consequence of this is a reduction in quality of the finished product. In each case, the recycling of the material would be connected with an increased expense.

The object of the invention is to avoid the above-mentioned drawbacks and further to optimize the production process so that an early detection of possibly occurring defects is possible, before decisive irreversible changes in the material to be pressed have occurred.

According to the invention, this object is achieved in that the pressing power or force and the press path are measured from the beginning of the pressing process and are compared with one or more given pressure/-path setpoint values or a pressure curve, and any deviations lying outside a range of tolerance are used as a signal for early ending of the pressing process.

According to another feature of the invention, the decision for early ending of the pressing process is made at a time early enough so that as yet no irreversible processes that may exert a quality-reducing influence on the end product have occurred in the material to be pressed.

To be able to determine also with this process the correct mold-filling capacity for the subsequent pressing process, the deviations from the pressure/path setpoint value lying outside and inside the range of tolerance, determined in a known way at the end of the pressing process, are used to correct the mold-filling capacity of the subsequent pressing process. In the case of early ending of the pressing process, the determined deviations from the pressure/path setpoint value are projected to the end of the pressing process and used to correct the mold-filling amount of the subsequent pressing process.

In the case of pressure molds with several cavities, to avoid an overloading of individual cavities, because of uneven filling, the ending of the pressing process in the case of deviations from the pressure/path-tolerance value takes place at the latest at a pressure that corresponds to the maximum pressure for a cavity.

For recycling the material of reject formed bodies, resulting from the early ending of the pressing process, the reject formed body is crushed or crumbled into a particulate material and this material is again fed to the material to be pressed.

For uniform distribution of the crumbly material in the material to be pressed, the crumbly material is continuously added in a specific, technologically favorable amount to the material to be pressed during the feeding to the press and mixed with the latter.

Since the additives, which were added to the materials to be pressed, are present still undamaged in the crumbly material of the reject formed body in the case of the early ending of the pressing process, the crumbly material is added immediately after the crumbling of the mold-filling material and after its enrichment with additives directly in the feeding to the press.

According to an advantageous embodiment of the invention, the reject formed body is introduced in a crushing device and the crushed crumbly material is guided into a storage tank, which, above a conveyor belt and viewed in conveying direction of the conveyor belt, is placed in front of a material container containing the material to be pressed.

According to another feature of the invention, the crushed crumbly material can be sprinkled in or fed by a suitable device to a material container containing the material to be pressed, so that a partial mixing of the crumbly material with the material automatically takes place after removal of the material by the conveyor belt.

The advantages achieved with the invention consist especially in the fact that by the detection of the press path and the pressing power as early as at the beginning of the pressing process, an early detection of reject formed bodies is made possible with the consequence of immediate switching off of the press. In this stage of the pressing process, the reject formed body is in a state that permits a recycling that is not harmful to the quality of the end product. As a result, the production costs with steady quality of the end product can be reduced by avoidance of waste material and saving of cycle time. The process according to the invention offers, moreover, also a protection from overloadings of the pressure mold, which can occur, for example, in the case of overfilling the pressure cavity. This applies especially to pressure molds with several pressure cavities placed side by side. When overfilling a cavity, the total pressing power on this one cavity would be affected at the beginning of the pressing process, while the other cavities would be almost pressureless. In this case, damages of the cavity can be prevented only by an early turning off of the press or the pressing power. Simultaneously, the adjustment of the filling capacity known in the art can be supplemented with a few additional steps.

Figure 2:
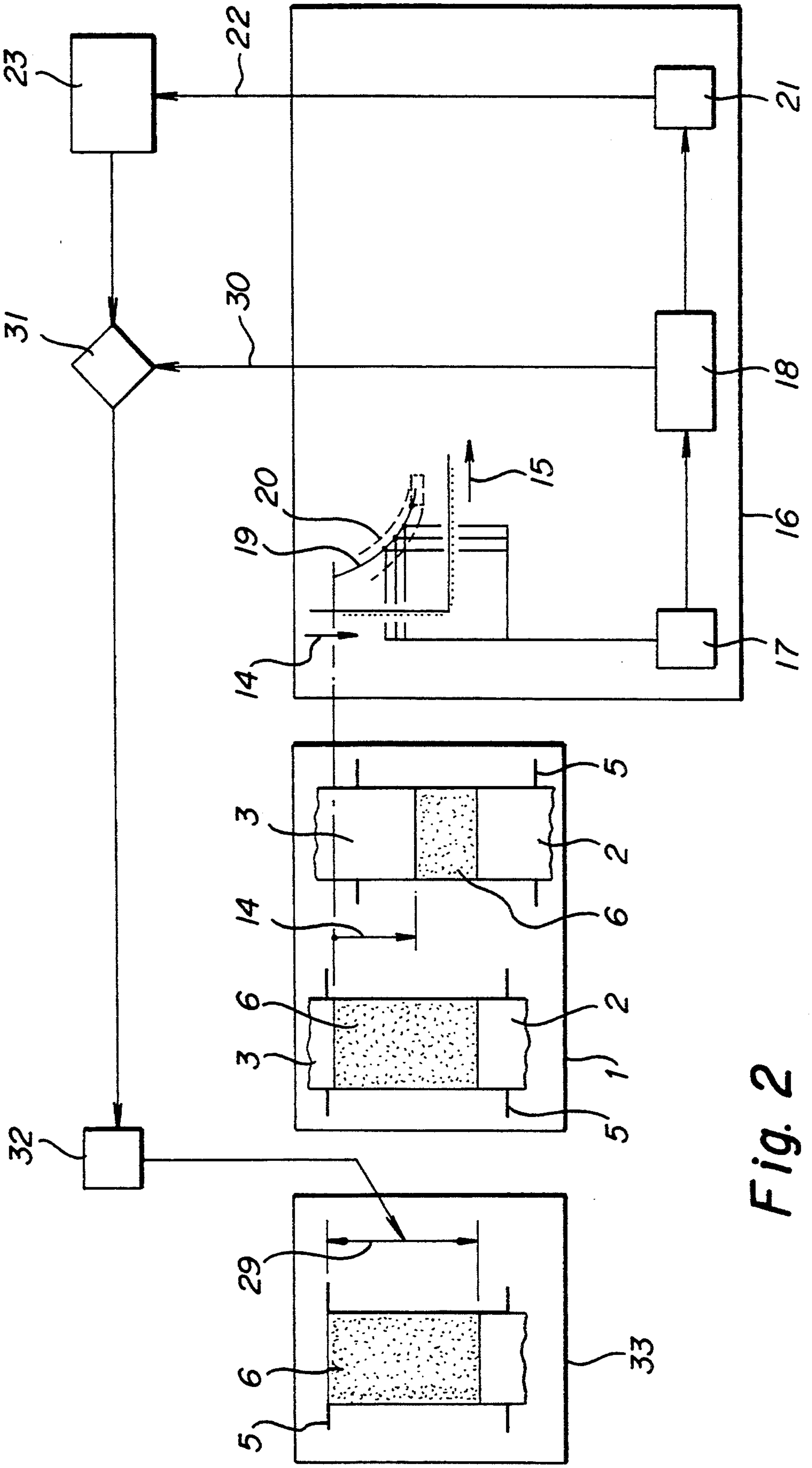

The invention is explained in more detail in the following description and drawings, which are exemplary wherein FIG. 1 is a diagrammatic representation of a brick press with feeding of material and FIG. 2 is a diagrammatic representation of the control of the pressing process.

In FIG. 1, a hydraulically operated brick press 1 with a stationary bottom ram 2, a movable upper punch 3 and an also movable pressure mold 5, guided on vertical columns 4, are represented. Material 6 to be pressed, which consists of a granular or powdery, in particular ceramic material, is fed by a conveyor pipe 7 to a material container 8. Previously, various additives were mixed with material 6 to improve the physical and chemical properties. The underside of material container 8 is formed by a conveyor belt 9, with which material 6 is fed to a metering device 10. With the help of horizontally movable metering device 10, material 6 is put in pressure mold 5.

After the filling of pressure mold 5, the pressing process is started and upper punch 3 moves downward. In this case, pressure mold 5 is also lowered by a smaller amount for uniform densification of material 6, as diagrammatically represented in FIG. 2. After ending of the pressing process, final-pressed formed body 11 is demolded by lowering pressure mold 5 and retracted and removed from pressure mold 5 on a horizontal table 12 with the help of an extraction device 13 (FIG. 1).

A monitoring of press path 14 and pressing power 15 of brick press 1 also takes place simultaneously with the beginning of the pressing process (FIG. 2). By a sensor, not shown, that is placed in a known way on brick press 1, press path 14 is constantly measured and relayed to a measuring and comparison device 16. Pressing power or force 15 is also measured in a known way and relayed to measuring and comparison device 16. There, the measured values are detected by a receiving element 17 and compared in another device 18 with a given pressure curve 19, which represents the ratio of pressing power 15 and press path 14 as setpoint value.

If the comparison performed in measuring and comparison device 16 produces deviations from the pressure/path setpoint value or from preset pressure curve 19, which lie outside a range of tolerance 20, brick press 1 is turned off by a command element 21 of measuring and comparison device 16 and a control line 22, which leads to a machine control 23, and the pressing process is ended early. As a consequence, a reject formed body 24 is formed, which is put in a crushing device 25 by rocking of table 12 (FIG. 1). In this stage of the pressing process, the structure of reject formed body 24 is still relatively soft and loose, so that it can be crushed or crumbled in crushing device 25 at low cost. Crumbly material 28 is guided by a conveyor pipe 26 from crushing device 25 to a collecting tank 27, which, viewed in the conveying direction of conveyor belt 9, is placed in front of material container 8. Crumbly material 28 is poured from collecting tank 27 in a specific amount on continuous conveyor belt 9 and mixed with material 6. In this case, the mixing of crumbly material 28 and material 6 is selected in a technologically acceptable ratio to achieve a uniform distribution and mixing of crumbly material 28, which can deviate somewhat with respect to its composition and grain size of material 6. An addition of additives to crumbly material 28 is not necessary, since these substances, because of the early ending of the pressing process, are still present in reject formed body 24, without impairing their effectiveness.

Crumbly material 28 can also be sprinkled by a branch pipe 34 directly in material container 8, so that a partial mixing of crumbly material 28 with material 6 to be pressed is performed automatically after removal of the material by conveyor belt 9.

Another advantageous possibility of use of the process according to the invention is provided in that the pressing power is automatically turned off if, during the monitoring, an overloading of the pressure mold because of an excessive pressing power is shown. In certain phases of the initial operation of the press with a new mold or a new batch of material, during removal of a batch, in downtime, etc., irregularities often arise in the filling of the mold cavity, which lead to an increased pressing power. This applies in particular to pressure molds with several pressure cavities placed side by side. When filling the cavities, it can happen that one cavity is filled with more material than the adjacent cavity. In this case, the maximum pressing power is exerted on the cavity with the maximum filling amount. As a consequence, the walls of the cavity and/or the press die are overloaded and damaged. This leads to expensive repairs, connected with a loss in production. Since the pressure/path curve in such situations also does not correspond to the normal course, here, too, the pressing power in the case of deviations from the setpoint value or from preset pressure curve 19 is turned off early according to the invention and the pressing process is ended. As a result, there is produced in a simple way an advantageous mold safety device, which previously was achieved only by means of the mostly electronic measurement of the voltage in the press die or on other pressing elements with a corresponding expense and often without sufficient reliability. The reject formed bodies developed because of the early ending of the pressing process are recycled in the work cycle in the same way as already described.

Moreover, the process according to the invention also allows for the adjustment of mold-filling amount 29, on whose size the final measurement of the height or thickness of formed body 11 depends (FIG. 2). If the comparison performed in measuring and comparison device 16 at the end of pressing process produces deviations from preset pressure curve 19, a correction of mold-filling amount 29 is performed for the subsequent pressing process because of these deviations by a control line 30, which leads to a control unit 31 and a correcting element 32. With early ending of the pressing process, the determined deviations, which have led to the switching-off of the press, projected to the end of the pressing process and to correct mold-filling amount 29 are used for the subsequent pressing process. The adjustment of mold-filling amount 29 takes place in a known way with the help of a filling amount adjustment device 33. The change of the mold-filling amount can be achieved, for example, by moving pressure mold 5 upward or downward.

It will be understood that this invention is susceptible to modification in order to adapt it to different usages and conditions, and accordingly, it is desired to comprehend such modifications within this invention as may fall within the scope of the appended claims.

What is claimed is:

1. A process for the control and regulation of the pressing process of a brick press in the production of formed bodies from free-flowing ceramic materials comprising the steps of measuring the pressing force and pressing path from the beginning of the pressing process to obtain values thereof, comparing the measured values with previously determined standard values of pressing force and pressing path, generating a signal responsive to any deviations of the measured values from an established range of tolerances for the standard values, ending the pressing process prior to the termination thereof in response to a generated deviation signal, and ending the pressing process prior to the occurrence of any irreversible processes in the material being pressed which might adversely affect the quality of the end product.

2. A process as claimed in claim 1 and the steps of rejecting a formed body developed at an early ending of the pressing process, crushing the rejected formed body into a particulate material, and feeding the resultant crushed particulate material to the material to be pressed.

3. A process as claimed in claim 2 wherein the quantity of crushed particulate material is added continuously to the material to be pressed at a rate predetermined to produce an optimum quality of a pressed body.

4. A process as claimed in claim 2 and the step of enriching the resultant crushed particulate material during its feeding to the press with selected additives.

5. An apparatus for the control and regulation of a brick press in the production of formed bodies from free-flowing ceramic materials comprising a brick press, means for containing material to be pressed, means for conveying the material to be pressed from said containing means to a mold in said brick press, means responsive to deviations of pressing force and pressing path from established ranges of tolerances therefor for rejecting formed bodies prior to the termination of a pressing process, means for crushing a rejected formed body into a particulate material, and a collecting tank disposed above said conveying means to receive crushed particulate material such that the crushed particulate material is added selectively to the conveyed material to be pressed.

6. An apparatus for the control and regulation of a brick press in the production of formed bodies from free-flowing ceramic materials comprising a brick press, means for containing material to be pressed, means for conveying material to be pressed from said containing means to a mold in said brick press, means responsive to deviations of pressing force and pressing path from established ranges of tolerances therefor for rejecting formed bodies prior to the termination of a pressing process, means for crushing a rejected formed body into a particulate material, and means for distributing crushed particulate material into said means for containing material to be pressed such that at least a partial mixing of the crushed particulate material with the material to be pressed occurs upon removal of material to be pressed from said containing means by said conveying means.

* * * * *